United States Patent
Kishida et al.

(10) Patent No.: US 12,019,911 B2
(45) Date of Patent: Jun. 25, 2024

(54) STORAGE MANAGEMENT APPARATUS, METHOD AND PROGRAM

(71) Applicant: NTT Communications Corporation, Tokyo (JP)

(72) Inventors: Tsunechika Kishida, Yokohama (JP); Hideaki Akabori, Yokohama (JP); Tatsuo Fujita, Yokohama (JP)

(73) Assignee: NTT Communications Corporation, Tokyo (JP)

( * ) Notice: Subject to any disclaimer, the term of this patent is extended or adjusted under 35 U.S.C. 154(b) by 193 days.

(21) Appl. No.: 17/299,185

(22) PCT Filed: Dec. 6, 2019

(86) PCT No.: PCT/JP2019/047819
§ 371 (c)(1),
(2) Date: Jun. 2, 2021

(87) PCT Pub. No.: WO2020/116612
PCT Pub. Date: Jun. 11, 2020

(65) Prior Publication Data
US 2022/0075563 A1    Mar. 10, 2022

(30) Foreign Application Priority Data
Dec. 6, 2018    (JP) ................................. 2018-229010

(51) Int. Cl.
*G06F 3/06*    (2006.01)

(52) U.S. Cl.
CPC .......... *G06F 3/0659* (2013.01); *G06F 3/0617* (2013.01); *G06F 3/0647* (2013.01); *G06F 3/067* (2013.01)

(58) Field of Classification Search
CPC .. G06F 3/0644; G06F 11/3485; G06F 3/0611; H04L 67/5682; H04L 9/40; H04L 67/5681
See application file for complete search history.

(56) References Cited

U.S. PATENT DOCUMENTS

| | | |
|---|---|---|
| 6,874,017 B1 | 3/2005 | Inoue et al. |
| 7,490,073 B1 | 2/2009 | Qureshi et al. |

(Continued)

FOREIGN PATENT DOCUMENTS

| | | |
|---|---|---|
| CN | 103116598 A | 5/2013 |
| CN | 107870916 A | 4/2018 |

(Continued)

OTHER PUBLICATIONS

Extended European Search Report for EP Application No. 19893316.0, dated Dec. 10, 2021, 7 pages.

(Continued)

*Primary Examiner* — Mahran Y Abu Roumi
(74) *Attorney, Agent, or Firm* — Knobbe, Martens, Olson & Bear, LLP

(57) ABSTRACT

In a system using edge computing, a technology for performing efficient storage management is provided. A storage management apparatus communicable with a plurality of edge servers each including a storage part storing data and access log information to the data is configured to acquire the access log information from each edge server; to decide, based on the acquired access log information, whether a state of access to the data stored in the storage part of each edge server meets a preset criterion; and to execute control to select, as a transfer target, data in the state of access which is decided as failing to meet the criterion, and to transfer the data to another storage part different from the storage part in which the data is stored.

10 Claims, 5 Drawing Sheets

(56) References Cited

U.S. PATENT DOCUMENTS

| | | | |
|---|---|---|---|
| 7,809,909 B2* | 10/2010 | Iwamura | G06F 11/2082 |
| | | | 709/217 |
| 8,566,549 B1* | 10/2013 | Burke | G06F 3/0644 |
| | | | 711/114 |
| 9,167,036 B2 | 10/2015 | Seed et al. | |
| 9,614,852 B2 | 4/2017 | Kiriyama et al. | |
| 9,898,539 B2 | 2/2018 | Kawamura et al. | |
| 9,910,470 B2 | 3/2018 | Garg et al. | |
| 10,118,296 B1* | 11/2018 | Gennis | B25J 9/1656 |
| 10,678,941 B2 | 6/2020 | Ohsaki et al. | |
| 10,922,325 B2 | 2/2021 | Yamato et al. | |
| 11,102,123 B2 | 8/2021 | Ohuchi | |
| 11,443,390 B1 | 9/2022 | Caligaris et al. | |
| 11,514,532 B1* | 11/2022 | Biasiolli | G06Q 40/12 |
| 2002/0052915 A1 | 5/2002 | Amin-Salehi | |
| 2002/0069420 A1* | 6/2002 | Russell | H04L 63/0428 |
| | | | 725/92 |
| 2003/0115421 A1* | 6/2003 | McHenry | H04L 67/5682 |
| | | | 711/158 |
| 2003/0140207 A1 | 7/2003 | Nagase et al. | |
| 2005/0114730 A1* | 5/2005 | Iwamura | G06F 11/2074 |
| | | | 714/13 |
| 2007/0078943 A1 | 4/2007 | Daniels et al. | |
| 2007/0157288 A1 | 7/2007 | Lim | |
| 2007/0169168 A1 | 7/2007 | Lim | |
| 2008/0060051 A1 | 3/2008 | Lim | |
| 2010/0070448 A1 | 3/2010 | Omoigui | |
| 2012/0069131 A1 | 3/2012 | Abelow | |
| 2012/0317366 A1* | 12/2012 | Sato | G06F 3/0647 |
| | | | 711/141 |
| 2013/0124615 A1 | 5/2013 | Sekiguchi et al. | |
| 2013/0204997 A1* | 8/2013 | Eggleston | H04L 43/0882 |
| | | | 709/223 |
| 2014/0277788 A1 | 9/2014 | Forbes, Jr. | |
| 2015/0271295 A1 | 9/2015 | Mahoney et al. | |
| 2015/0381927 A1* | 12/2015 | Mourning | H04N 7/183 |
| | | | 386/328 |
| 2016/0112263 A1 | 4/2016 | Henry et al. | |
| 2016/0204990 A1* | 7/2016 | Shattil | H04L 67/1021 |
| | | | 370/252 |
| 2016/0287189 A1 | 10/2016 | Modai et al. | |
| 2017/0053032 A1* | 2/2017 | Liongosari | G06Q 30/0201 |
| 2017/0134239 A1 | 5/2017 | Mahoney et al. | |
| 2017/0160951 A1 | 6/2017 | Borlick et al. | |
| 2017/0329533 A1 | 11/2017 | Agombar et al. | |
| 2017/0353367 A1 | 12/2017 | Slaight et al. | |
| 2017/0366513 A1 | 12/2017 | Kumaran | |
| 2018/0026913 A1 | 1/2018 | Balle et al. | |
| 2018/0088870 A1 | 3/2018 | Lv et al. | |
| 2018/0150489 A1 | 5/2018 | Yamazaki | |
| 2018/0167434 A1* | 6/2018 | Sathyanarayana | G06F 21/10 |
| 2018/0284758 A1 | 10/2018 | Cella et al. | |
| 2018/0293587 A1 | 10/2018 | Oda | |
| 2019/0036830 A1 | 1/2019 | Yamato | |
| 2019/0041835 A1 | 2/2019 | Cella et al. | |
| 2019/0044812 A1 | 2/2019 | Loftus et al. | |
| 2019/0080197 A1 | 3/2019 | Kato | |
| 2019/0208006 A1* | 7/2019 | Chen | H04L 67/10 |
| 2019/0281078 A1 | 9/2019 | Eguiarte Salazar et al. | |
| 2019/0281132 A1 | 9/2019 | Sethuraman et al. | |
| 2020/0344299 A1* | 10/2020 | Sohail | G06F 3/067 |
| 2022/0038535 A1 | 2/2022 | Kishida et al. | |
| 2022/0043867 A1 | 2/2022 | Kishida et al. | |

FOREIGN PATENT DOCUMENTS

| | | | |
|---|---|---|---|
| JP | 2000-276425 A | 10/2000 | |
| JP | 2003-085032 A | 3/2003 | |
| JP | 2005-534087 A | 11/2005 | |
| JP | 2007-41660 A | 2/2007 | |
| JP | 2015-176350 A | 10/2015 | |
| JP | 2016-085522 A | 5/2016 | |
| JP | 2016-139354 A | 8/2016 | |
| JP | 2017-84134 A | 5/2017 | |
| JP | 2017-167748 A | 9/2017 | |
| JP | 2018-81377 A | 5/2018 | |
| JP | 2020-009170 A | 1/2020 | |
| WO | WO2012/0164671 A1 | 12/2012 | |
| WO | WO2013/153890 A | 10/2013 | |
| WO | WO2014/045699 A1 | 3/2014 | |
| WO | WO 2018/180369 A1 | 10/2018 | |
| WO | WO 2020/116610 A1 | 6/2020 | |
| WO | WO 2020/116611 A1 | 6/2020 | |
| WO | WO 2020/116612 A1 | 6/2020 | |
| WO | WO 2021/035084 A1 | 2/2021 | |

OTHER PUBLICATIONS

U.S. Appl. No. 17/299,240 Pub. No. 2022/0043867, filed Jun. 2, 2021, Data Search Apparatus, and Data Search Method and Program Thereof, and Edge Server and Program Thereof.

U.S. Appl. No. 17/299,235 Pub. No. 2022/0038535, filed Jun. 2, 2021, Data Search Apparatus, and Data Search Method and Program Thereof, and Edge Server and Program Thereof.

Japanese Office Action for JP Application No. 2018-229020, dated Jun. 7, 2022, 8 pages.

Japanese Office Action for JP Application No. 2018-228987, dated Jun. 7, 2022, 7 pages.

English Translation of International Preliminary Report on Patentability for PCT Application No. PCT/JP2019/047819, dated Jun. 8, 2021, in 7 pages.

Extended European Search Report for EP Application No. 19893078.6, dated Jan. 4, 2022, 9 pages.

Extended European Search Report for EP Application No. 19893830.0, dated Jan. 4, 2022, 10 pages.

International Search Report and Written Opinion for PCT Application No. PCT/JP2019/047817, dated Mar. 10, 2020 in 13 pages.

International Preliminary Report on Patentability for Application No. PCT/JP2019/047817, dated Jun. 17, 2021 in 11 pages.

International Search Report and Written Opinion for PCT Application No. PCT/JP2019/047818, dated Mar. 10, 2020 in 15 pages.

International Preliminary Report on Patentability for PCT Application No. PCT/JP2019/047818, dated Jun. 17, 2021 in 13 pages.

International Search Report and Written Opinion for PCT Application No. PCT/JP2019/047819, dated Feb. 18, 2020 in 13 pages.

International Preliminary Report on Patentability for PCT Application No. PCT/JP2019/047819, dated Jun. 17, 2021 in 11 pages.

Xialong, L. et al., "Resource Information Retrieval Method and Application Based on Name Service in the Internet of Things", Chinese Master's Theses Full-Text Database Information Science and Technology, Mar. 2017, Issue 03, 64 pages.

Chinese Office Action for CN Application No. 201980080474.2, dated Sep. 28, 2023, 32 pages.

Chinese Office Action for CN Application No. 201980080545.9, dated Oct. 25, 2023, 21 pages.

Atsushi Terauchi et al., Grappling with data exchange technology which provides real-time scalability of computation processing, [online], NTT Technical Journal, Jul. 2017, pp. 19-23, Internet <URL:http://www.ntt.co.jp/journal/1707/files/JN20170719.pdf>.

International Search Report for PCT Application No. PCT/JP2019/047817, dated Mar. 10, 2020 in 5 pages.

International Search Report for PCT Application No. PCT/JP2019/047818, dated Mar. 10, 2020 in 5 pages.

International Search Report for PCT Application No. PCT/JP2019/047819, dated Feb. 18, 2020 in 5 pages.

* cited by examiner

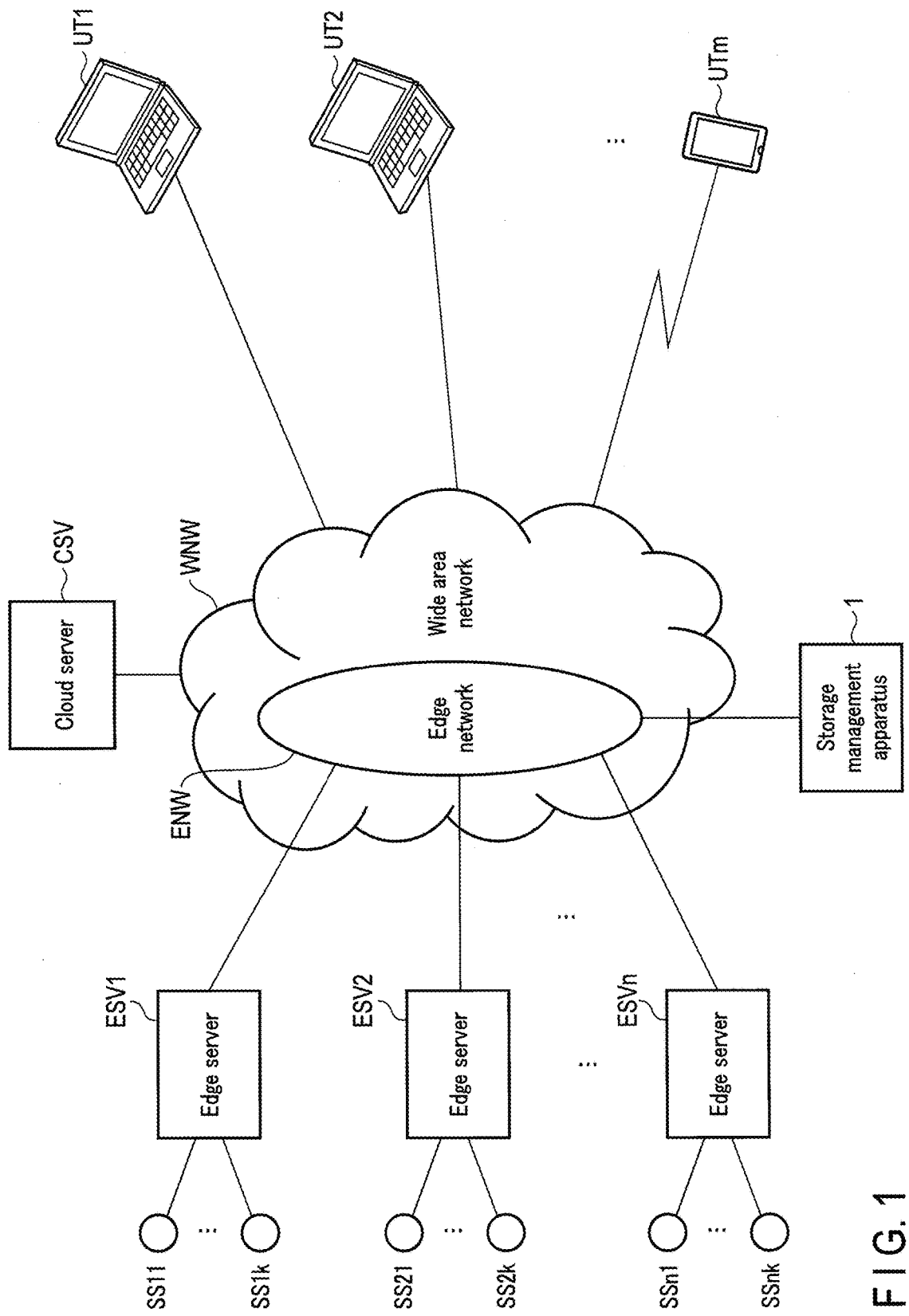
F I G. 1

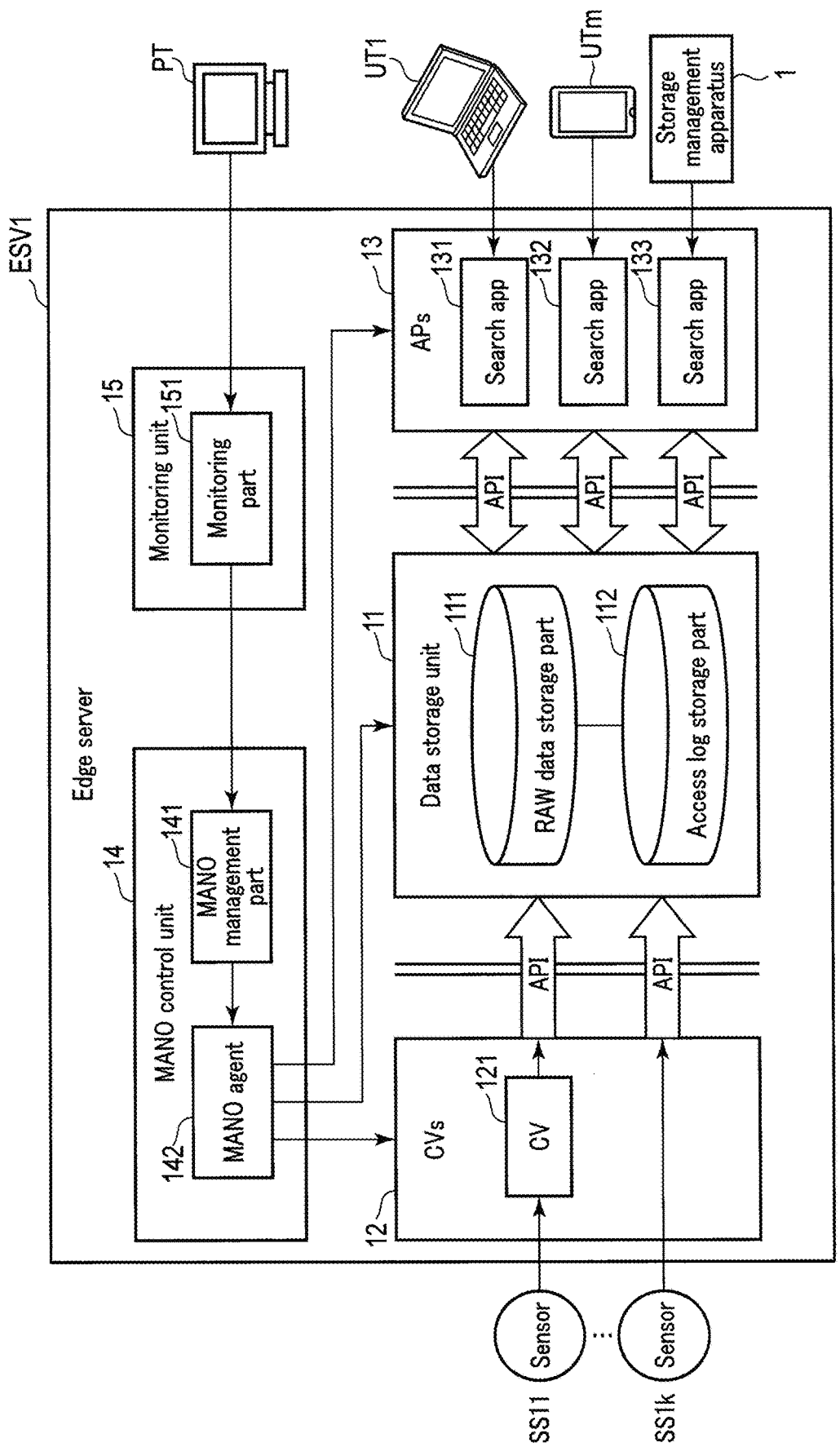
F I G. 2

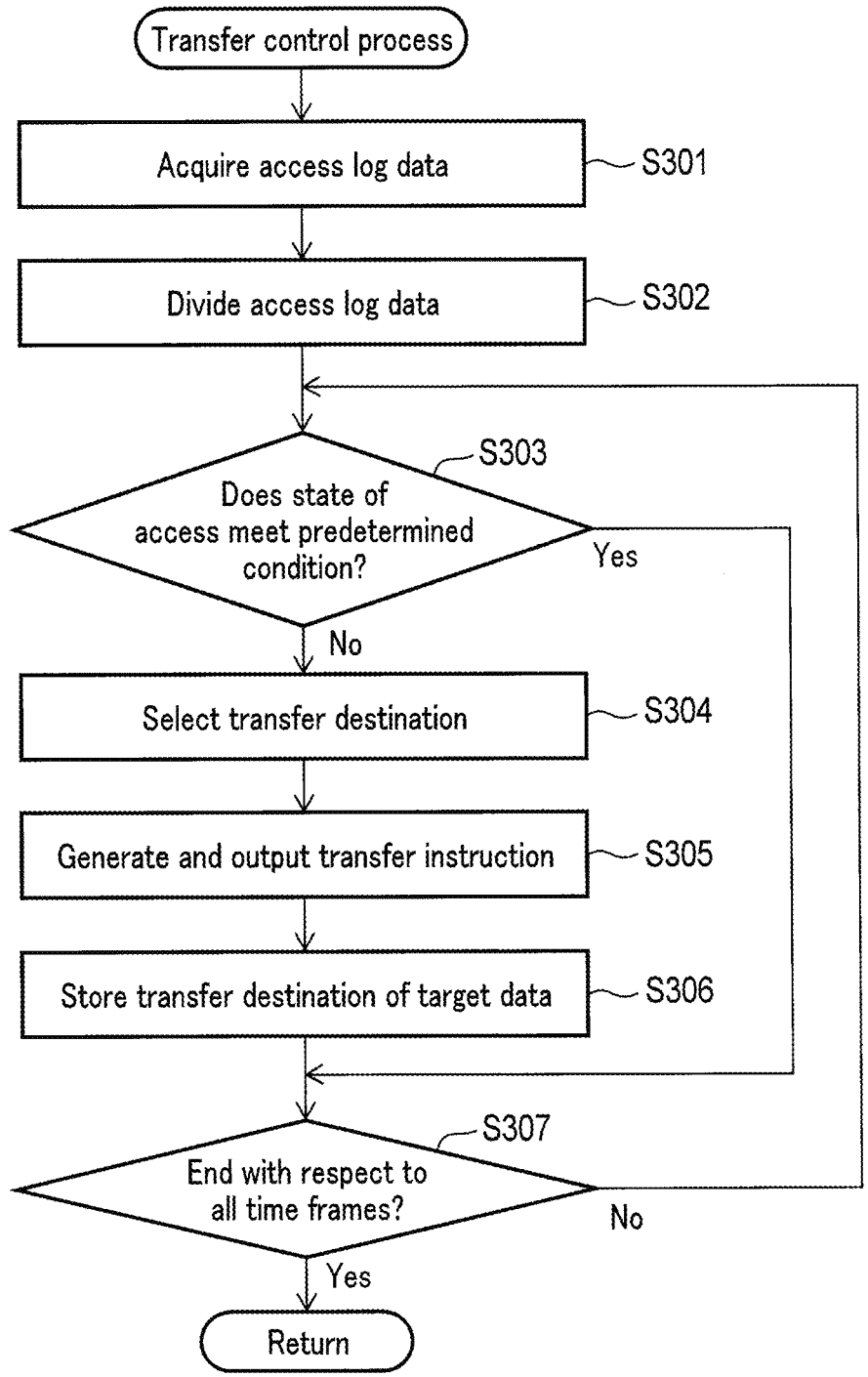
F I G. 5

STORAGE MANAGEMENT APPARATUS, METHOD AND PROGRAM

This is a U.S. national phase application under 35 USC 371 of International Application No. PCT/JP2019/047819 (not published in English), filed Dec. 6, 2019.

FIELD

One mode of the present invention relates to a storage management apparatus used in a data circulation system utilizing edge computing, a method, and a program.

BACKGROUND

In recent years, attention has been paid to a data circulation system using IoT (Internet of Things) technology, in which, for example, devices including various sensors are connected to a network and sensing data is collected from these devices and utilized.

In the data circulation system using the IoT technology, it is indispensable to utilize various IoT data in combination, in order to further enhance the value creation, and there is an increasing demand for the realization of "IoT data exchange society" which circulates and utilize the IoT data across services. In order to meet the demand, IoT data exchange technology, which exactly and scalably transmits IoT data from various kinds of devices to various applications, is important.

In realizing such technology, edge computing technology has been proposed. In the edge computing, a plurality of edge servers are distributedly arranged at peripheral parts of a carrier network. The edge server includes an arithmetic processing function and a storage function, and executes an application program and stores content data. A user, who intends to utilize IoT data, accesses each edge server from his/her own terminal, searches data, and acquires desired IoT data (see, e.g. NPL 1).

CITATION LIST

Non Patent Literature

NPL 1: Atsushi TERAUCHI, et al., "Grappling with data exchange technology which provides real-time scalability of computation processing", [online], NTT Technical Journal, July 2017, Internet.

SUMMARY

Technical Problem

It can be said that edge servers are small-scale cloud data centers distributedly arranged near a user, and counter-parts, with which the user's terminal directly communicates, are the edge servers. Accordingly, with a system using edge computing, data can be acquired with a less propagation delay than in the case where IoT data is all acquired from a cloud.

However, if a greater amount of data is collected by sensors with the advancement of the above-described "IoT data exchange society", an enormous amount of data is accumulated in the edge servers, and there is concern that the storage capacity of the edge servers becomes tight.

The present invention has been made by paying attention to the above circumstances, and the object of the invention is to provide a technology for performing efficient storage management in a system using edge computing.

Solution to Problem

In order to achieve the above object, according to a first mode of the present invention, there is provided a storage management apparatus communicable with a plurality of edge servers each including a storage part storing data and access log information to the data, the storage management apparatus including: an access log information acquisition part configured to acquire the access log information from each of the edge servers; an access state decision part configured to decide, based on the acquired access log information, whether a state of access to the data stored in the storage part meets a preset criterion with respect to each of the edge servers; and a control part configured to execute control to select, as a transfer target, data in the state of access which is decided as failing to meet the criterion, and to transfer the data to another storage part different from the storage part in which the data is stored.

According to a second mode of the present invention, in the above-described first mode, the storage management apparatus further includes a storage area information acquisition part configured to acquire information relating to a state of use of a storage area with respect to each of the storage parts included in the edge servers, wherein the control part includes: a first transfer destination selection part configured to select the another storage part from among the storage parts of the edge servers, based on the acquired information relating to the state of use of the storage area; and a first transfer control part configured to execute control to transfer the data of the transfer target to the selected another storage part.

According to a third mode of the present invention, in the above-described first mode, when the edge servers are communicable with a cloud server via a network, the control part includes: a second transfer destination selection part configured to select a storage part which the cloud server includes, as the another storage part; and a second transfer control part configured to execute control to transfer the data of the transfer target to the selected another storage part.

According to a fourth mode of the present invention, in the above-described first mode, the control part includes: a third transfer destination selection part configured to select a storage part which the storage management apparatus includes, as the another storage part; and a third transfer control part configured to execute control to transfer the data of the transfer target to the selected another storage part.

According to a fifth mode of the present invention, in the above-described first mode, the control part is configured to select, as the another storage part, a storage medium with a lower access speed than the storage part in which the data of the transfer target is stored.

According to a sixth mode of the present invention, in the above-described first mode, the access state decision part is configured to count a number of accesses by a predetermined data unit with respect to the data stored in the storage part of each of the edge servers, and to decide that the criterion is not met when a total of the number of accesses in a latest first period is less than a first threshold.

According to a seventh mode of the present invention, in the above-described first mode, the access state decision part is configured to measure an elapsed time from a time point of storage or from a latest access by a predetermined data unit with respect to the data stored in the storage part of each of the edge servers, and to decide that the criterion is not met when the elapsed time from the time point of storage or from the latest access exceeds a second threshold.

According to an eighth mode of the present invention, in the above-described first mode, the access state decision part is configured to decide whether the state of access to the data stored in the storage part of the edge server meets the preset criterion, by using at least one of identification information of the edge server that is to be set as a decision target, identification information of the data that is to be set as a decision target, a period that is to be set as a decision target, and a time frame length that is to be set as a decision unit, each of which is designated by the preset criterion.

According to a ninth mode of the present invention, in the above-described first mode, the access state decision part is configured to decide whether the state of access to the data stored in the storage part of the edge server meets the preset criterion, by using at least one of identification information of the edge server that is to be excluded from a decision target, identification information of the data that is to be excluded from a decision target, and a period that is to be excluded from a decision target, each of which is designated by the preset criterion.

Advantageous Effects

According to the first mode of the present invention, in the storage management apparatus, it is decided, based on the access log information acquired from each edge server, whether the state of access to the data stored in the storage part of each edge server meets the preset criterion, and the data in the state of access, which is decided as failing to meet the criterion, is selected as the transfer target and transferred to another storage part. Thus, for example, when data, which has not been accessed, is present in the data stored in a certain edge server, this data is transferred to some other storage part. Thereby, the storage area of the storage part of each edge server can properly be managed, and it is possible to prevent such a problem that an overflow or the like occurs in the storage part of a specific edge server.

According to the second mode of the present invention, the transfer destination for the transfer of the data is selected from among the data storage parts of the edge servers, based on the state of use of the storage area of each edge server. Thereby, in the system using edge computing, the data can be distributedly stored among the edge servers, and the storage of each edge server can efficiently be used.

According to the third mode of the present invention, the storage part which the cloud server includes is selected as the transfer destination of the data. Thereby, the data in the state of access, which fails to meet the predetermined criterion, is transferred from the storage part of the edge server to the storage part of the cloud server. In general, the storage part of the cloud server has a larger capacity than the edge server. Thus, the storage part of the cloud server can effectively be utilized, and the storage resources, which are limited as the entire system, can efficiently be used.

According to the fourth mode of the present invention, the storage part which the storage management apparatus includes is selected as the transfer destination of the data. Thereby, the data in the state of access, which fails to meet the predetermined criterion, is transferred from the storage part of the edge server to the storage part of the storage management apparatus. Thus, a free capacity of the storage part of the edge server can be secured, and the storage location of data can easily be managed in a centralized manner in the storage management apparatus.

According to the fifth mode of the present invention, the storage medium with a lower access speed than the storage part of the edge server is selected as the transfer destination of the data. Thereby, the storage of the edge server, which is capable of high-speed access, can effectively be utilized, and the storage resources, which are limited as the entire system, can efficiently be used.

According to the sixth mode of the present invention, it is decided whether the total of the number of accesses in the latest first period is less than the first threshold by a predetermined unit of data. When the total of the number of accesses is less than the first threshold, the data is decided as the transfer target. Thereby, the data with a small number of accesses is transferred to another storage part, and the storage of the edge server can efficiently be utilized.

According to the seventh mode of the present invention, it is decided whether the elapsed time from the time point of storage or from the latest access exceeds the second threshold by a predetermined unit of data. When the elapsed time exceeds the threshold, the data is decided as the transfer target. Thereby, as regards the data which has not been accessed for a predetermined time or more, the transfer to another storage part is controlled, and the storage of the edge server, which is capable of high-speed access, can efficiently be utilized.

According to the eighth mode of the present invention, the decision as to the state of access is executed by using at least one of the identification information of the edge server that is to be set as a decision target, the identification information of the data that is to be set as a decision target, the period that is to be set as a decision target, and the time frame length that is to be set as a decision unit, each of which is designated by the preset criterion. Thereby, by setting the specific edge server, specific data or specific period as the target, or by using the designated decision unit, the storage management based on the decision under a more detailed condition can be realized.

According to the ninth mode of the present invention, the decision as to the state of access is executed by using at least one of the identification information of the edge server that is to be excluded from a decision target, the identification information of the data that is to be excluded from a decision target, and the period that is to be excluded from a decision target, each of which is designated by the preset criterion. Thereby, by excluding the specific edge server, specific data or specific period from the decision target, the storage management based on the decision under a more detailed condition can be realized.

Specifically, according to each mode of the present invention, it is possible to provide a technology for performing efficient storage management in a system using edge computing.

BRIEF DESCRIPTION OF THE DRAWINGS

FIG. 1 is a diagram illustrating an entire configuration of a data circulation system including a storage management apparatus according to one embodiment of the present invention.

FIG. 2 is a block diagram illustrating a configuration of an edge server of the data circulation system illustrated in FIG. 1.

FIG. 5 is a flowchart illustrating an example of a process procedure and process contents of a transfer control process among processes illustrated in FIG. 4.

DETAILED DESCRIPTION

Figure 3:
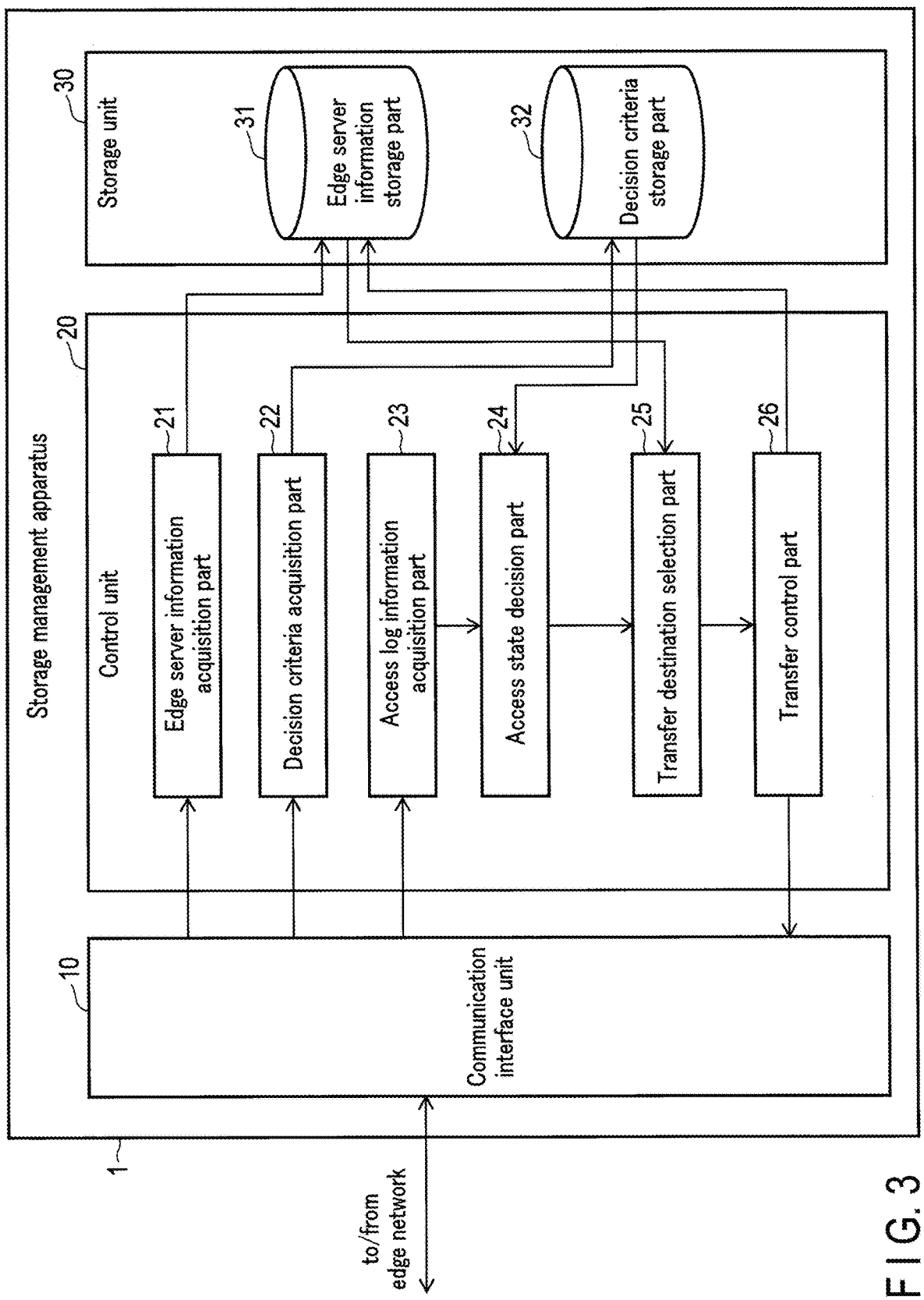
FIG. 3 is a block diagram illustrating a functional configuration of the data search apparatus used in the data circulation system illustrated in FIG. 1.

Hereinafter, embodiments relating to the present invention will be described with reference to the accompanying drawings.

One Embodiment (Configuration)
(1) System

FIG. 1 is a diagram illustrating an entire configuration of a data circulation system including a storage management apparatus according to one embodiment of the present invention.

The data circulation system is configured such that edge servers ESV1 to ESVn functioning as data provision-side apparatuses, user terminals UT1 to UTm functioning as data acquisition-side apparatuses, and a cloud server CSV are connected via a wide area network WNW, and, furthermore, a storage management apparatus 1 is provided.

The wide area network WNW includes, for example, a public network such as the Internet, and an access network for accessing the public network. The access network includes an edge network ENW which connects the edge servers ESV1 to ESVn. The edge network ENW is constructed by, for example, a LAN (Local Area Network) or a wireless LAN. Note that the edge servers ESV1 to ESVn may be configured to be connected to the Internet without intervention of the edge network ENW.

The edge servers ESV1 to ESVn are composed of, for example, server computers or gateways, and are disposed in respective monitoring targets which are, mainly, factories and business facilities managed by companies or bodies; hospitals; office buildings; commercial establishments; event/amusement facilities; animal and plant farming facilities; infrastructure facilities such as houses, roads, bridges, steel towers, and space facilities; and natural environments such as volcanos, coasts, islands, mountains and fields. Note that the edge servers ESV1 to ESVn may be provided not only in the above-mentioned stationary infrastructure facilities, but may be provided in association with areas of movement of moving bodies such as vehicles, airplanes, drones and ships. In addition, the edge servers ESV1 to ESVn may be disposed in existing communication facilities, such as base stations of mobile communication systems, low-power-type small-sized base stations, integration stations, access points of wireless LAN or the like, and DSL (Digital Subscriber Line) boxes.

The edge servers ESV1 to ESVn are connected to a plurality of sensors SS11 to SS1$k$, SS21 to SS2$k$, . . . , SSn1 to SSnk, respectively. The sensors SS11 to SS1$k$, SS21 to SS2$k$, . . . , SSn1 to SSnk include, for example, equipment sensors which measure vibrations, strains and temperatures of equipment; environment sensors which measure temperatures, humidity, atmospheric pressure, wind velocity, and dust concentration; monitoring sensors which detect positions, movements, numbers and the like of humans and animals by using cameras or the like; and biological sensors which measure body temperatures, blood pressure, pulsations, and the like of humans.

Sensing data measured or detected by the sensors SS11 to SS1$k$, SS21 to SS2$k$, . . . , SSn1 to SSnk is transmitted to the edge servers ESV1 to ESVn which are preset as transmission destinations, via wireless interfaces which adopt low-power wireless data communication standards such as LAN, wireless LAN, Bluetooth (trademark) and the like. Note that the sensing data transmitted from the sensors SS11 to SS1$k$, SS21 to SS2$k$, . . . , SSn1 to SSnk may be transmitted to the edge servers ESV1 to ESVn via access points, mobile terminals such as smartphones, or the like.

The cloud server CSV is composed of a cloud computer, and receives sensing data, which is transmitted from the edge servers ESV1 to ESVn, via the wide area network WNW, and accumulates the sensor data. In addition, when receiving a data acquisition request from the user terminal, UT1 to UTm, the cloud server CSV transmits the sensing data, which is indicated by the data acquisition request, to the user terminal, UT1 to UTm, which is the source of the request.

The user terminals UT1 to UTm are used by, for example, service business operators or the like that acquire and analyze sensing data, and are composed of a personal computer, a smartphone, a tablet terminal, and the like. The user terminal, UT1 to UTm, includes, for example, a browser for the acquisition process of the sensing data.

(2) Edge Server

FIG. 2 is a block diagram illustrating an example of the configuration of the edge server, ESV1 to ESVn. Note that FIG. 2 representatively illustrates only the edge server ESV1, for the purpose of simpler illustration.

The edge server, ESV1 to ESVn, includes a data storage unit 11, converters (CVs) 12, applications (APs) 13, a control unit 14, and a monitoring unit 15.

The data storage unit 11 is composed as a storage medium by, for example, a nonvolatile memory capable of random write and read, such as an HDD (Hard Disk Drive) or an SSD (Solid State Drive). A RAW data storage part 111 is provided in the storage area, and the sensing data transmitted from the sensors SS11 to SS1$k$ is stored in the RAW data storage part 111. In addition, an access log storage part 112, which stores access log information relating to the access to the sensing data in the RAW data storage part 111, is also provided in the storage area.

The CVs 12 include a plurality of converters (CVs) 121. The converters 121 are provided in association with those of the sensors SS11 to SS1$k$, which require protocol conversion processing. The converters 121 convert the sensing data, which is received from the sensors SS11 to SS1$k$, to, for example, protocols suited to data circulation. The sensing data converted by the converters 121 is stored in the RAW data storage part 111 by APIs (Application Programming Interfaces). Note that a time stamp representative of a measurement date/time, and identification information (sensor IDs) of the sensors are imparted to the sensing data. In addition, a record ID, which discriminates a record, may be imparted to the sensing data.

The APs 13 include a plurality of application programs for search (hereinafter referred to as "search apps") 131 to 133. Responding to data search requests from the user terminals UT1 and UTm and a storage management apparatus 1 (to be described later), the search apps 131 to 133 execute processes of reading the corresponding sensing data from the RAW data storage part 111 and transmitting the sensing data to the sources of the requests. At this time, identification information (hereinafter referred to as "edge ID") of the edge server ESV1 is imparted to the transmission data. Note that a data transfer process between the search apps 131 to 133 and the RAW data storage part 111 is also executed by the APIs.

The monitoring unit 15 is composed of monitoring middleware, and includes a monitoring part 151 functioning as a monitoring tool. The monitoring part 151 provides display screen data for operation management to an operation management terminal PT, receives instruction information for operation management, which is input in the operation management terminal PT, and supplies the instruction information to the control unit 14.

The control unit 14 includes a MANO (Management and Orchestration) management part 141 and a MANO agent 142. The MANO management part 141 and the MANO agent 142 are configured to execute an integral management/control/optimization process of network services and resources in the edge server ESV1, and manage respective software containers (programs) that are management targets in the edge server ESV1, based on the instruction information for operation management, which is supplied from the monitoring part 151.

(3) Data Search Server

FIG. 3 is a diagram illustrating a functional configuration of the storage management apparatus 1 according to one embodiment of the present invention.

The storage management apparatus 1 is operated by, for example, a network business operator, communication business operator or service operator that operates data circulation services. The storage management apparatus 1 is composed of a server computer or a personal computer.

The storage management apparatus 1 includes a communication interface unit 10, a control unit 20, and a storage unit 30.

The communication interface unit 10 executes transmission of various data with the edge servers ESV1 to ESVn and the user terminals UT1 to UTm, according to communication protocols used in the edge network ENW and wide area network WNW. Note that the communication interface unit 10 is also used when data communication with the cloud server CSV is executed.

The storage unit 30 is composed as a storage medium by combining, for example, a nonvolatile memory capable of random write and read, such as an HDD (Hard Disk Drive) or an SSD (Solid State Drive), a nonvolatile memory such as a ROM (Read Only Memory), and a volatile memory such as a RAM (Random Access Memory). A program storage area and a data storage area are provided in the storage area of the storage unit 30. The program storage area stores necessary programs for executing various control processes relating to one embodiment of the present invention.

An edge server information storage part 31 and a decision criteria storage part 32 are provided in the data storage area.

The edge server information storage part 31 is used to store various attribute information (hereinafter referred to as "edge server information") relating to the edge servers ESV1 to ESVn. The edge server information includes, for example, edge IDs, position information, operational environments and processing performances of the respective edge servers; IDs of the sensors connected to each edge server; the kind of sensing data stored in the RAW data storage part 111; and information relating to the storage area of the edge server, which includes an entire storage capacity and a free capacity relating to the RAW data storage part 111.

The decision criteria storage part 32 is used to store decision criteria which are used when deciding whether the state of access to the data in the RAW data storage part 111 of each edge server, ESV1 to ESVn, meets a predetermined criterion. The decision criteria may include, for example, a data unit for executing decision (e.g. by a fixed time, by a fixed number, or the like); a threshold relating to the number of accesses in a predetermined period; and a threshold relating to an elapsed time from a time point of storage or from a latest access. The decision criteria may be fixed ones, or may be criteria which are updated, where necessary, by a system administrator or the like.

Note that the edge server information storage part 31 and the decision criteria storage part 32 may not necessarily be built in the storage management apparatus 1, but may be provided in an external storage apparatus such as a database server disposed in a cloud. In this case, the storage management apparatus 1 can acquire and use necessary data by accessing the database server or the like (not illustrated) via the wide area network WNW. Alternatively, the edge server information storage part 31 and the decision criteria storage part 32 may be external storage media such as USB memories.

The control unit 20 includes, for example, a hardware processor such a CPU (Central Processing Unit), and includes, as control functions for realizing one embodiment of the present invention, an edge server information acquisition part 21, a decision criteria acquisition part 22, an access log information acquisition part 23, an access state decision part 24, a transfer destination selection part 25, and a transfer control part 26. These control functional parts are realized by causing the hardware processor to execute the programs stored in the program storage area of the storage unit 30.

The edge server information acquisition part 21 executes a process of accessing the edge servers ESV1 to ESVn via the communication interface unit 10, acquiring the edge server information from each edge server, and storing the edge server information in the edge server information storage part 31 by correlating the edge server information with the edge ID. The edge server information acquisition part 21 functions also as a storage area information acquisition part, and acquires, as one item of the edge server information, information relating to the storage area, which includes an entire storage capacity and a free capacity relating to the RAW data storage part 111 of each edge server.

The decision criteria acquisition part 22 executes a process of acquiring preset decision criteria, which are received from an external apparatus via the communication interface unit 10 or are input through an input device (not illustrated), and storing the decision criteria in the decision criteria storage part 32.

The access log information acquisition part 23 executes a process of accessing the edge servers ESV1 to ESVn via the communication interface unit 10, and acquiring access log information from each edge server. The access log information is information which records a history of accesses from the user terminals UT1 to UTm to the data in the RAW data storage parts 111 of the edge servers ESV1 to ESVn. The access log information may include various information items, such as an access date/time, an IP address of an access source, a MAC address of an access source, a database account, an OS account, an application account, a target object name, a command, an SQL statement, a bind value, and an execution result (success/failure/rejection).

The access state decision part 24 executes a process of receiving access log information which the access log information acquisition part 23 acquires; reading out decision criteria stored in the decision criteria storage part 32; deciding whether the state of access to the data in the RAW data storage part 111 of each edge server, ESV1 to ESVn, meets a decision criterion, based on the access log information; and delivering a decision result to the transfer destination selection part 25. For example, the access state decision part 24 decides that the data, which has not been accessed from any of the user terminals UT1 to UTm for a predetermined time, is the data in the access state which fails to meet a predetermined criterion, and decides that the data, which has been accessed even once, is the data in the access state which meets a predetermined criterion, and outputs the decision result by correlating the decision result with the identification information of each data.

The transfer destination selection part 25 executes a process of receiving the decision result by the access state decision part 24, and selecting a transfer destination of the data in the access state decided as failing to meet the predetermined criterion, from the current storage part of the data.

The transfer control part 26 executes a process of generating and outputting, based on the selection result received from the transfer destination selection part 25, a transfer instruction to instruct the transfer of the target data to the selected transfer destination.

(Operation)

Next, an information processing operation by the storage management apparatus 1 with the above-described configuration will be described.

Figure 4:
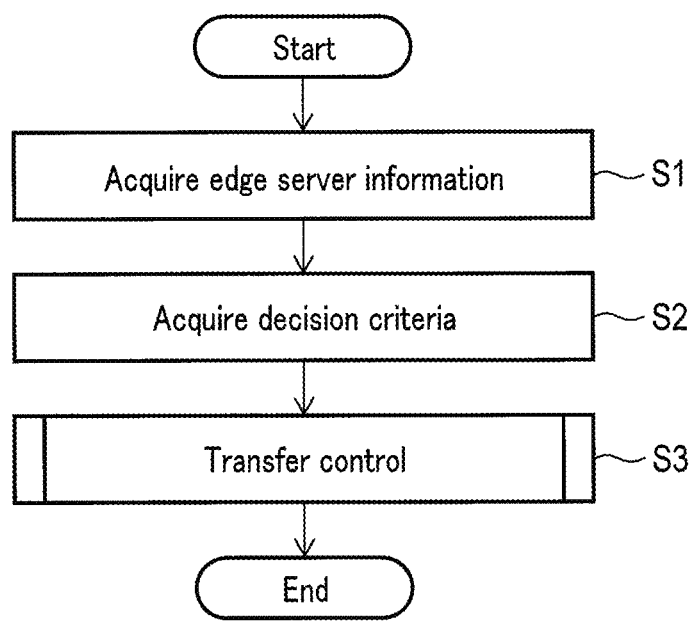
FIG. 4 is a flowchart illustrating an example of a process procedure and process contents by the storage management apparatus illustrated in FIG. 3.

FIG. 4 is a flowchart illustrating an example of a process procedure by the storage management apparatus 1.

(1) Acquisition of Edge Server Information

The control unit 20 of the storage management apparatus 1 first acquires in step S1 the edge server information from each of the edge servers ESV1 to ESVn under the control of the edge server information acquisition part 21, and stores the edge server information in the edge server information storage part 31.

Here, the storage management apparatus 1 may be configured to acquire the edge server information by periodically accessing each of the edge servers ESV1 to ESVn, or to acquire the edge server information by causing each edge server, ESV 1 to ESVn, to periodically transmit necessary edge server information. Alternatively, the storage management apparatus 1 may be configured to acquire the edge server information from another server such as the cloud server CSV. For example, each edge server, ESV 1 to ESVn, may be caused to periodically transmit the edge server information to the cloud server CSV, and the storage management apparatus 1 may acquire the edge server information from the cloud server CSV periodically or in response to a request of the system administrator.

The edge server information includes, at least, the edge ID of each edge server, the sensor IDs of the sensors connected to each edge server, and the storage area information including the entire storage capacity and free capacity relating to the RAW data storage part 111.

Note that the above-described step may be executed periodically at preset intervals, or may be executed by using as a trigger the reception of the request from the system administrator.

(2) Acquisition of Decision Criteria

Next, the control unit 20 of the storage management apparatus 1 acquires in step S2 decision criteria which are preset by the system administrator or the like, under the control of the decision criteria acquisition part 22, and stores the decision criteria in the decision criteria storage part 32.

The decision criteria acquisition part 22 may be configured to acquire, for example, the decision criteria which are input through an input device (not illustrated), or may be configured to read out the decision criteria which are prestored in the cloud server CSV, by accessing the cloud server CSV via the wide area network WNW.

The decision criteria are criteria which are used when deciding whether the state of access to the data in the RAW data storage part 111 of each edge server, ESV1 to ESVn, meets a predetermined criterion. For example, in addition to the data unit for executing decision (e.g. by a fixed time, by a fixed number, or the like), the threshold relating to the number of accesses in a predetermined period, and the threshold relating to the elapsed time from a time point of storage or from a latest access, the decision criteria may include an edge ID designating which edge server is to be set as a decision target; a sensor ID designating which sensing data is to be set as a decision target; a target period designating which of periods, in which sensing data is acquired, is to be set as a decision target; and a time frame length designating a length of a unit time frame as a decision unit within the target period. For example, when a period of the last ten years is designated as the target period and a month unit is designated as the time frame length by the decision criteria, the decision on the access state is executed in each of 120 (12 months/year×10 years) time frames.

The decision criteria may be criteria designating an edge ID, a sensor ID, or an excluded target period, which is to be excluded from the decision target or transfer target. Thereby, such a configuration can be adopted that the sensing data necessary for automatic driving support, which requires real-time processing with a low delay, can always be stored in the edge servers without being transferred, regardless of the state of access. Alternatively, for example, by designating the last one month as the excluded target period in the decision criteria, such a configuration can be adopted that the data of the last one month is always be stored in the edge servers without being transferred.

Note that step S2 may be executed following step S1, or may be executed before step S1, or may be executed simultaneously with step S1 in parallel. Alternatively, step S1 and step S2 may be executed separately and independently. Alternatively, the decision criteria may be prestored in the decision criteria storage part 32, and step S2 may be omitted.

(3) Transfer Control

Next, in step S3, the control unit 20 of the storage management apparatus 1 executes a process of transfer control. FIG. 5 is a flowchart illustrating in detail a process procedure and process contents of this process.

To start with, in step S301, the control unit 20 of the storage management apparatus 1 accesses the edge servers ESV1 to ESVn under the control of the access log information acquisition part 23, acquires access log information as access log data from the access log storage part 112, and delivers the access log information to the access state decision part 24.

Here, the access log data may be acquired by extracting data corresponding to a desired period from an access log accumulated as a text file, or may be acquired by extracting necessary information from a table of a relational database which cooperates with the sensing data in the RAW data storage part 111 of each edge server, ESV1 to ESVn. In addition, the storage management apparatus 1 may include a buffer memory for temporarily storing the acquired access log data. The acquired access log data includes, at least, date/time information of an access to the data in the RAW data storage part 111 of each edge server, ESV1 to ESVn, and identification information (sensor ID or record ID) of the data that is the target of the access.

Next, in step S302, the control unit 20 of the storage management apparatus 1 executes a process of reading out the decision criteria stored in the decision criteria storage part 32, under the control of the access state decision part 24, and dividing the access log data into decision units, based on the decision criteria. In one embodiment, the access state decision part 24 divides the access log data by a time unit (by one-day unit, by one-week unit, by one-month unit, or the like) designated by the decision criteria, and further divides the divided access log data by a sensor ID unit. Thereby, the state of access to the sensing data can be decided on a sensor-by-sensor basis in every predetermined time. Note that the unit of the decision is not limited to this, and the system administrator or the like can designate discretionary criteria including the time unit and the kind of data.

In step S303, under the control of the access state decision part 24, the control unit 20 of the storage management apparatus 1 decides, based on the divided access log data, whether the state of access from the user terminal, UT1 to UTm, to the sensing data by the time unit and by the sensor ID unit meets preset criterion or not. The access state refers to an arbitrary state relating the access from the user terminal, UT1 to UTm. For example, although not limited to the following, a total number of accesses per unit time, an access interval, an access frequency, a cumulative access number, an ID of a user terminal UT of a source of access, an execution result (success rate), and the like can be used for the decision.

In one embodiment, the access state decision part 24 counts a total of a number of accesses in each unit time frame with respect to the sensing data having a specific sensor ID, and decides whether the total access number in each time frame meets a predetermined criterion or not. For example, when the access number in a certain time frame is 1 or more, the access state decision part 24 decides that the predetermined criterion is met, and when the access number is zero, the access state decision part 24 decides that the predetermined criterion is not met. When it is decided that the predetermined criterion is met, the process advances to step S307. On the other hand, in step S303, when it is decided that the predetermined criterion is not met, the process advances to step S304 in order to control the transfer of the data in this time frame.

Next, in step S304, under the control of the transfer destination selection part 25, the control unit 20 of the storage management apparatus 1 selects a transfer destination for the data that is in the access state failing to meet the predetermined criterion. In one embodiment, the transfer destination selection part 25 reads out the latest edge server information from the edge server information storage part 31, and selects, as a transfer destination, an edge server (or the RAW data storage part 111 thereof) having a highest ratio of a free capacity, by calculating the ratio of the free capacity to the entire storage capacity with respect to each of the edge servers. Alternatively, the transfer destination selection part 25 may select a transfer destination at random from among edge servers in which the ratio of the free capacity to the entire memory capacity exceeds a predetermined value. Besides, the transfer destination selection part 25 can select, as a transfer destination, the cloud server CSV (or the storage part thereof) or the storage management apparatus 1 itself.

In step S305, under the control of the transfer control part 26, in order to instruct the edge server ESV, which stores the data of the transfer target, to transfer the data, the storage management apparatus 1 generates a transfer instruction including at least the identification information of the target data (e.g. the date/time or period information, sensor ID, record ID, or the like) and the identification information of the transfer destination (e.g. the edge ID, the IP address of the cloud server, or the like), and outputs the transfer instruction to the edge server ESV. When the access number is small but the storage capacity of the edge server has some free space, it is conceivable that the edge ID at the output destination of the transfer instruction becomes identical to the edge ID of the transfer destination. In this case, the transfer control part 26 may discard the transfer instruction, without outputting the transfer instruction.

In step S306, under the control of the transfer control part 26, the storage management apparatus 1 outputs, together with the date/time information of the generation of the transfer instruction, the edge ID of the edge server ESV that is the output destination of the transfer instruction, the identification information of the target data and the identification information of the transfer destination to the edge server information storage part 31, and can update the information table with respect to the latest location of data. However, this step is a discretionary step, and the information table may be updated by the edge server information acquisition process which is periodically executed.

In step S307, under the control of the control unit 20, the storage management apparatus 1 decides whether the decision on all time frames is completed with respect to the target period designated in the decision criteria. If the decision is finished with respect to all time frames, the transfer control process is terminated. If there remains a time frame on which the decision is not yet executed, the process returns to step S303, and the process of steps S303 to S307 is repeated.

Note that the access log data may not be divided by the unit time frame, and it is possible to decide whether access is executed in the entire target period designated by the decision criteria. For example, the sensor IDs included in the access log over the entire target period, such as the last one month, may be collated with the sensor IDs included in the edge server information stored in the edge server information storage part 31, and, if the sensor ID that is not included in the access log is present in the edge server information, the data relating to this sensor ID may be decided as being not accessed for a predetermined time, and may be set as the transfer target. Alternatively, the target period may not be set, and only the data, which has not been accessed since the time point of storage in the edge server, may be set as the transfer target. In this manner, the details of the data that is the transfer target may be freely set by the system administrator through the decision criteria.

Note that step S3 (steps S301 to S307) may be executed separately and independently from step S1 and step S2. For example, step S3 may be periodically executed at time intervals which are different from time intervals in step S1 and step S2, or may be executed by using as a trigger an instruction by the system administrator or the like.

When the edge server, ESV1 to ESVn, receives a search request from the user terminal, UT1 to UTm, with respect to the data that is already transferred to some other transfer destination, this edge server ESV, for example, can transfer the search request to the storage management apparatus 1. The storage management apparatus 1, which receives the search request, searches a latest storage destination of the data, based on the latest information stored in the edge server information storage part 31, and can instruct the storage destination (edge server ESV, cloud server CSV, storage management apparatus 1 itself, or the like) to transmit the data to the user terminal that is the source of the request. Alternatively, each time the edge server, ESV1 to ESVn, receives the transfer request, the edge server, ESV1 to ESVn, may be configured to store the identification information of the transfer destination, together with the identification information of the data, in the RAW data storage part 111 or access log storage part 112, and the edge server ESV, which receives the search request, may be configured to directly send the transmission instruction to the transfer destination to send the data to the user terminal of the source of the request.

(Advantageous Effects)

As has been described above in detail, in one embodiment, in the data circulation system using edge computing, among the sensing data stored in the RAW data storage parts 111 of the edge servers ESV1 to ESVn, the data with a small number of accesses from the user terminals UT1 to UTm is decided as being the transfer target, and control is executed to transfer this data from the storage part 111 of the edge server ESV to some other storage part.

In the edge computing, in general, such a configuration is adopted that the edge-side environment is equipped with an application program (an application with a high real-time performance such as a monitoring application), and a totalization process is executed on the edge side. In addition, such a solution is implemented that only data with a degree of necessity for statistics analysis or the like is filtered and transferred to the cloud side, and AI analysis or the like is performed batchwise, and thereby the cloud and the edges are made to have their appropriate roles.

According to the above-described embodiment, among the sensing data in the RAW data storage parts 111 of the edge servers ESV1 to ESVn, the sensing data with a small number of accesses from the user terminals UT1 to UTm is deemed to be data that is not recently used, and is saved in some other storage part. Thereby, the storage area of the edge server, ESV1 to ESVn, can be secured for sensing data with a greater number of accesses. The sensing data with a small number of accesses can be transferred to and stored in, for example, the storage part of another edge server with some free space in the storage capacity, or the cloud server CSV including a storage for large-capacity, long-term storage.

Thereby, the storage capacity of an edge server, which is generally expensive and is capable of high-speed access, can effectively be utilized, and, as regards the data with a large number of accesses, an effective load distribution can be realized while maintaining a high-speed access performance. In addition, by freely designating the edge IDs and sensor IDs through the decision criteria, the data that is to be set as a transfer target can be precisely set. Thus, while sensing data, which does not require real-time processing, is distributedly stored according to the frequency of access, sensing data, which requires real-time processing, can be maintained in the edge server ESV. Thereby, even in industrial fields which require real-time processing with a low delay, such as automatic driving support and real-time control of robots, the edge servers ESV capable of high-speed access can effectively be utilized.

Alternatively, the storage management apparatus 1 itself can be selected as the transfer destination. Thereby, after the sensing data is once shifted to the storage management apparatus 1, an appropriate transfer destination can be selected at an appropriate timing and the sensing data can be transferred, and more effective load distribution and storage management can be realized.

OTHER EMBODIMENTS

Note that the present invention is not limited to the above-described embodiment.

For example, in the above-described one embodiment, the example was described in which the storage management apparatus 1 is provided independently from the edge servers ESV1 to ESVn and the cloud server CSV. However, aside from this, the functions of the respective control parts included in the storage management apparatus 1 may be provided in any one of the edge servers ESV1 to ESVn or in the cloud server CSV, or may be provided in a terminal or a server which the user uses.

In addition, each edge server, ESV1 to ESVn, was described as including the access log storage part 112 in addition to the RAW data storage part 111, but the embodiment is not limited to this. For example, without providing the access log storage part 112, the access log information may be stored by adding the access log information to the data table of the sensing data accumulated in the RAW data storage part 111, or the metadata of the sensing data may be automatically updated. Besides, as described above, the access log information may be stored in a text file form, or may be stored as a data table, or may be stored in another freely selected form.

The decision on the access state is not limited to the above embodiment, and the decision can be made by various methods. For example, it may be decided whether a value, which is obtained by dividing the cumulative access number by the elapsed time from the time of storage, exceeds a predetermined threshold or not. Thereby, the storage management, in which a long-term access tendency is taken into account, can be performed.

Additionally, the acquisition of the access log information can be realized by various methods. For example, each server may periodically transmit a latest access log file to the storage management apparatus 1. Alternatively, access log files of all edge servers may be accumulated in a cloud storage, and the storage management apparatus 1 may read out the access log file from the cloud storage when necessary.

Additionally, the storage management apparatus 1 may be provided as one of the edge servers ESV1 to ESVn. Alternatively, the storage management apparatus 1 may be the cloud server CSV.

Note that, in FIG. 1, the numbers of sensors SS11 to SS1$k$, SS21 to SS2$k$, . . . , SSn1 to SSn$k$, which are connected to the respective edge servers ESV1 to ESVn, are illustrated as being equal. However, aside from this, a freely chosen number of sensors may be connected to each edge server.

Furthermore, in one embodiment, the sensing data, which is selected as the transfer target in the edge server, is transferred to and stored in any one of another edge server with a relatively large free capacity, the cloud server, and the storage part in the storage management apparatus. However, aside from this, for example, a selection priority order may be given to the transfer destinations, and the transfer control of the sensing data of the transfer target may be executed based on the selection priority order and the free capacities of the transfer destinations. For example, at first, it is decided whether edge servers are usable as transfer destinations. When an edge server having a predetermined amount or more of the free capacity is not found among the edge servers, the cloud server or the storage part of the storage management apparatus may be selected and the transfer control may be executed. In addition, in this case, a selection priority order may be given to the cloud server and the storage part of the storage management apparatus. In short, the priority order may be set on the edge servers, the cloud server and the storage part of the storage management apparatus by any method.

Besides, the kinds and methods of use of the edge server information and access log information can be variously modified in practice without departing from the spirit of the invention.

In short, the present invention is not limited directly to the above-described embodiments. In practice, the structural elements can be modified and embodied without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

REFERENCE SIGNS LIST

1 . . . Storage management apparatus
10 . . . Communication interface unit
11 . . . Data storage unit
12 . . . Converters (CVs)
13 . . . Applications (APs)
14 . . . Control unit
15 . . . Monitoring unit
20 . . . Control unit
21 . . . Edge server information acquisition part
22 . . . Decision criteria acquisition part
23 . . . Access log information acquisition part
24 . . . Access state decision part
25 . . . Transfer destination selection part
26 . . . Transfer control part
30 . . . Storage unit
31 . . . Edge server information storage part
32 . . . Decision criteria storage part
111 . . . Data storage part
112 . . . Access log storage part
121 . . . Converter (CV)
131 to 133 . . . Search apps
141 . . . MANO management part
142 . . . MANO agent
151 . . . Monitoring part

The invention claimed is:

1. A storage management apparatus communicable with a plurality of edge servers each including a storage part storing data and access log information to the data, the storage management apparatus comprising:
a controller comprising a hardware processor configured to:
acquire the access log information from each of the edge servers;
determine, based on the acquired access log information, whether a state of access to the data stored in the storage part meets a preset criterion with respect to each of the edge servers; and
select, as a transfer target, data in the state of access which is decided as failing to meet the criterion, and to transfer the data to another storage part different from the storage part in which the data is stored,
wherein the criterion includes an ID of first sensing data which requires real-time processing and is excluded from the transfer target,
the controller is further configured to exclude the first sensing data which requires real-time processing from the transfer target based on the ID of the first sensing data, and
the controller is further configured to select, as a transfer target, second sensing data which does not require real-time processing among sensing data in the state of access which is decided as failing to meet the criterion, and
wherein when the plurality of edge servers are communicable with a cloud server via a network, the hardware processor is further configured to:
select a storage part which the cloud server includes, as the another storage part; and
transfer the data of the transfer target to the selected another storage part.

2. The storage management apparatus of claim 1, wherein the hardware processor is further configured to:
acquire information relating to a state of use of a storage area with respect to each of the storage parts included in the edge servers;
select the another storage part from among the storage parts of the edge servers, based on the acquired information relating to the state of use of the storage area; and
transfer the data of the transfer target to the selected another storage part.

3. The storage management apparatus of claim 1, wherein the hardware processor is further configured to:
select a storage part which the storage management apparatus includes, as the another storage part; and
transfer the data of the transfer target to the selected another storage part.

4. The storage management apparatus of claim 1, wherein the hardware processor is further configured to select, as the another storage part, a storage medium with a lower access speed than the storage part in which the data of the transfer target is stored.

5. The storage management apparatus of claim 1, wherein the hardware processor is further configured to measure an elapsed time from a time point of storage or from a latest access by a predetermined data unit with respect to the data stored in the storage part of each of the edge servers, and to decide that the criterion is not met when the elapsed time from the time point of storage or from the latest access exceeds a second threshold.

6. The storage management apparatus of claim 1, wherein the hardware processor is further configured to decide whether the state of access to the data stored in the storage part of the edge server meets the preset criterion, by using at least one of identification information of the edge server that is to be set as a decision target, identification information of the data that is to be set as a decision target, a period that is to be set as a decision target, and a time frame length that is to be set as a decision unit, each of which is designated by the preset criterion.

7. The storage management apparatus of claim 1, wherein the hardware processor is further configured to decide whether the state of access to the data stored in the storage part of the edge server meets the preset criterion, by using at least one of identification information of the edge server that is to be excluded from a decision target, identification information of the data that is to be excluded from a decision target, and a period that is to be excluded from a decision target, each of which is designated by the preset criterion.

8. A storage management method executed by a storage management apparatus communicable with a plurality of edge servers each including a storage part storing data and access log information to the data, the storage management method comprising:

acquiring the access log information from each of the edge servers;

determining, based on the acquired access log information, whether a state of access to the data stored in the storage part meets a preset criterion with respect to each of the edge servers; and selecting, as a transfer target, data in the state of access which is decided as failing to meet the criterion, and to transfer the data to another storage part different from the storage part in which the data is stored, wherein the criterion includes an ID of first sensing data which requires real-time processing and is excluded from the transfer target, said determining comprises excluding the first sensing data which requires real-time processing from the transfer target based on the ID of the first sensing data, and said selecting comprises selecting, as a transfer target, second sensing data which does not require real-time processing among sensing data in the state of access which is decided as failing to meet the criterion, and wherein when the plurality of edge servers are communicable with a cloud server via a network, the storage management method further comprises:

selecting a storage part which the cloud server includes, as the another storage part; and transferring the data of the transfer target to the selected another storage part.

9. A non-transitory computer readable medium storing a program causing a computer to execute a storage management method for a storage management apparatus communicable with a plurality of edge servers each including a storage part storing data and access log information to the data, the storage management method comprising:

acquiring the access log information from each of the edge servers;

determining, based on the acquired access log information, whether a state of access to the data stored in the storage part meets a preset criterion with respect to each of the edge servers; and selecting, as a transfer target, data in the state of access which is decided as failing to meet the criterion, and to transfer the data to another storage part different from the storage part in which the data is stored, wherein the criterion includes an ID of first sensing data which requires real-time processing and is excluded from the transfer target, said determining comprises excluding the first sensing data which requires real-time processing from the transfer target based on the ID of the first sensing data, and said selecting comprises selecting, as a transfer target, second sensing data which does not require real-time processing among sensing data in the state of access which is decided as failing to meet the criterion, and wherein when the plurality of edge servers are communicable with a cloud server via a network, the storage management method further comprises:

selecting a storage part which the cloud server includes, as the another storage part; and transferring the data of the transfer target to the selected another storage part.

10. The storage management apparatus of claim 1, wherein the controller is further configured to count a number of accesses by a predetermined data unit with respect to the data stored in the storage part of each of the edge servers, and to decide that the criterion is not met when a total of the number of accesses in a latest first period is less than a first threshold.

\* \* \* \* \*